United States Patent [19]

Kennett

[11] Patent Number: 4,639,938
[45] Date of Patent: Jan. 27, 1987

[54] RF PULSE TRANSMITTER HAVING INCIDENTAL PHASE MODULATION (IPM) CORRECTION

[75] Inventor: Scott W. Kennett, West Jordan, Utah

[73] Assignee: E-Systems, Inc., Dallas, Tex.

[21] Appl. No.: 795,407

[22] Filed: Nov. 6, 1985

[51] Int. Cl.[4] .......................................... H04L 25/49
[52] U.S. Cl. ...................................... 375/60; 455/126; 332/18; 332/37 D; 330/149
[58] Field of Search ................... 375/60; 455/102, 126; 332/18, 37 D, 37 R; 330/149

[56] References Cited

U.S. PATENT DOCUMENTS

| | | | |
|---|---|---|---|
| 3,528,037 | 9/1970 | Koichi Yamazaki | 332/1 |
| 3,590,384 | 6/1971 | van Gerwen | 375/61 |
| 3,659,041 | 4/1973 | Kitaoka et al. | 332/1 |
| 3,755,754 | 8/1973 | Putz | 330/149 |
| 3,806,807 | 4/1974 | Nakamura | 375/60 |
| 3,810,018 | 5/1974 | Stover | 332/18 |
| 3,831,094 | 8/1974 | Stover | 332/37 |
| 3,900,823 | 8/1975 | Sokal et al. | 330/149 |
| 3,973,201 | 8/1976 | Andren | 375/60 |
| 4,087,755 | 5/1978 | LeGrand | 375/60 |
| 4,199,821 | 4/1980 | Munday | 375/60 |
| 4,291,277 | 9/1981 | Davis et al. | 330/149 |
| 4,346,479 | 8/1982 | Weber | 332/37 |
| 4,412,337 | 10/1983 | Bickley et al. | 375/60 |
| 4,554,514 | 11/1985 | Whartenby et al. | 332/37 D |

OTHER PUBLICATIONS

R. J. Kelly, "System Considerations for the New DME/P International Standard," Jan. 1984, pp. 1–23, vol. AES-20, No. 1, *IEEE Transactions on Aerospace & Electronic Systems.*

Primary Examiner—Robert L. Griffin
Assistant Examiner—Raymond C. Glenny
Attorney, Agent, or Firm—Albert M. Crowder, Jr.

[57] ABSTRACT

An RF pulse transmitter, for use in precision distance measuring equipment (DME/P) of a microwave landing system, includes appropriate circuitry to correct for incidental phase modulation (IPM). The pulse transmitter includes a modulation circuit for generating an RF pulse having a pulse peak. A reference phase control circuit is provided to generate a reference signal. A phase detector receives the RF pulse and the reference signal and in response thereto generates a phase error signal. The reference phase control circuit includes appropriate circuitry for adjusting the phase of the reference signal applied to the phase detector to thereby drive the phase error signal to a predetermined value at the pulse peak. A pre-distortion circuit generates a pre-modeled correction signal pulse for use in correcting for incidental phase modulation (IPM). A phase correction control circuit receives the phase error signal and in response thereto modulates the phase of the carrier signal to correct for the incidental phase modulation.

11 Claims, 7 Drawing Figures

RF PULSE TRANSMITTER HAVING INCIDENTAL PHASE MODULATION (IPM) CORRECTION

TECHNICAL FIELD

The present invention relates to pulse generation techniques and more particularly to an RF pulse transmitter having incidental phase modulation (IPM) correction.

BACKGROUND OF THE INVENTION

Microwave landing systems (MLS) facilitate aircraft approach and landing operations. These systems include so-called precision distance measuring equipment (DME/P), which provides aircraft distance information by measuring total round-trip time between pulse interrogations from an airborne transmitter and replies from a ground transponder. This type of system provides high accuracy ranging information in the severe multipath environment encountered during landing operations.

In operation, the ground transponder in the DME/P generates a time delay upon receipt of an interrogation pulse. After a fixed time, a reply pulse is transmitted by the transponder through use of an RF pulse transmitter. To provide accurate aircraft distance information over the closely-spaced channels in the system (usually located 1 MHz apart), the RF pulse transmitter in the transponder must provide a carefully shaped reply pulse to help conserve the available spectrum.

Typically, the reply pulse has a "cos/cos$^2$" envelope with a pulse rise time of 1 microsecond and a linear partial rise time of 250 nanoseconds. The pulse is generated by an RF modulator under the control of a modulation drive voltage. The RF modulator, however, normally produces incidental phase modulation (IPM) during the partial rise time of the pulse. Such modulation causes the upper frequency spectral components of the pulse to increase in amplitude, producing undesirable adjacent channel interference.

There is therefore a need for an improved RF pulse transmitter for use in precision distance measuring equipment, or in any other pulse transmitter where spectrum must be conserved, which includes incidental phase modulation (IPM) correction.

BRIEF SUMMARY OF THE INVENTION

The present invention relates to an RF pulse transmitter, preferably for use in precision distance measuring equipment (DME/P) of a microwave landing system, having incidental phase modulation (IPM) correction. In a preferred embodiment, the pulse transmitter produces RF "reply" pulses for the DME/P using a pulse modulator for generating a modulation drive signal, a synthesizer for generating a carrier frequency signal, a phase modulator for receiving the carrier frequency signal and generating a phase-modulated signal, and an RF modulation amplifier for receiving the phase-modulated signal and the modulation drive signal and in response thereto generating the RF pulses.

The RF modulation amplifier has, as an undesirable by-product, incidental phase modulation (IPM), which is then corrected according to the invention by circuitry in the pulse transmitter. Specifically, a phase detector is provided for receiving a sample of the RF pulse and a reference signal (at the carrier frequency) and in response thereto generating a phase error signal. A reference phase control circuit adjusts the phase of the reference signal applied to the phase detector to drive the phase error signal to a predetermined value at the pulse peak. To correct for transmitter IPM, phase modulation equal in magnitude but opposite in polarity to the undesired IPM is then introduced into the RF modulation amplifier.

In particular, a pre-distortion circuit receives the modulation drive signal from the pulse modulator and generates a correction signal for use in correcting incidental phase modulation. The correction signal, which is pre-modeled to be equal in magnitude but opposite in polarity to the expected IPM, is then applied to the phase modulator to adjust the phase of the carrier frequency signal applied to the RF modulation amplifier. A phase correction control circuit controls the amount of pre-modeled correction signal applied to the phase modulator to thereby correct for the incidental phase modulation. The phase correction control circuit produces a long term updated correction model of the phase of the RF pulse, and thereafter provides instantaneous phase correction to the phase modulator based on this model.

BRIEF DESCRIPTION OF THE DRAWINGS

For a more complete understanding of the present invention and the advantages thereof, reference is now made to the following Description taken in conjunction with the accompanying drawings in which.

DETAILED DESCRIPTION

Figure 1:
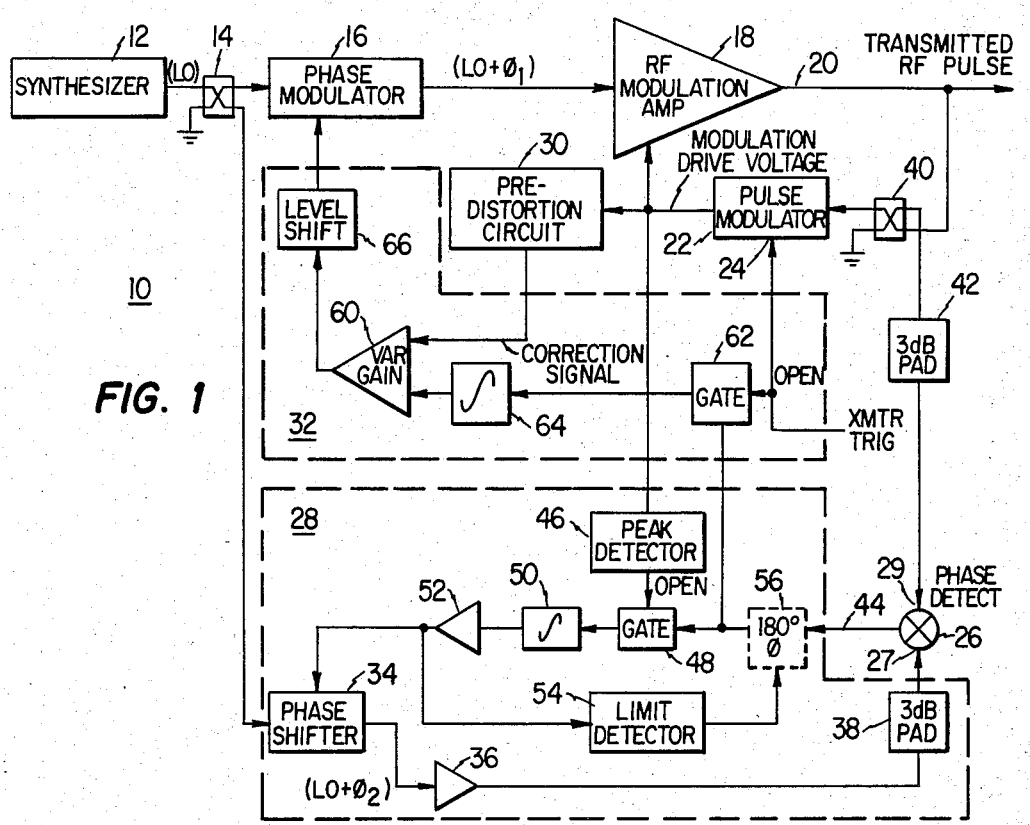
FIG. 1 is a block diagram of an RF pulse transmitter according to the present invention having incidental phase modulation (IPM) correction.

With reference now to the drawings, FIG. 1 is a block diagram of a preferred embodiment of an RF pulse transmitter 10 according to the present invention. The transmitter 10 forms part of a precision distance measuring equipment (DME/P) ground transponder used in a microwave landing system (MLS). As is known in the art, this type of transponder receives pulse pair interrogations from an interrogator located on an aircraft, and in response thereto uses the RF transmitter 10 to generate RF "reply" pulses which facilitate aircraft range determination.

Referring specifically to FIG. 1, the RF pulse transmitter 10 includes appropriate circuitry for generating the RF "reply" pulses. The transmitter 10 includes a frequency synthesizer 12 for generating an unmodulated carrier signal (LO). This carrier frequency signal is applied through a microwave power divider 14 to a phase modulator 16, which generates a phase-modulated signal (LO+$\phi_1$). The phase-modulated signal is then applied to an RF modulation amplifier 18, which generates the RF pulses (of frequency "LO") on the output line 20. The RF modulation amplifier 18 is driven by a modulation drive voltage supplied from a pulse modulator 22. Pulse modulator 22 is turned "on" by a transmitter trigger signal applied to a control terminal 24 thereof. The pulse modulator 22 applies the appropriate modulation to RF modulation amplifier 18 to generate the RF pulse.

Figure 2A:
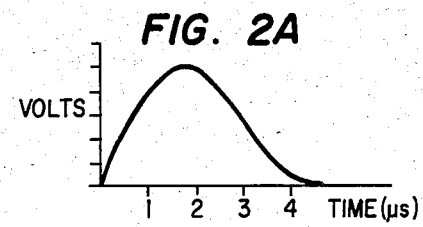
FIGS. 2A-2F are waveforms generated at various points in the RF pulse transmitter of FIG. 1.

As is known in the art, the DME/P requires a carefully shaped pulse to help conserve the rather limited frequency spectrum allocated for an individual channel of the microwave landing system. Typically, the modulation drive voltage supplied from the pulse modulator 22 defines a "cos/cos$^2$" envelope for the RF pulse, meaning that the leading pulse edge is shaped as the function "cos" and the trailing pulse edge is shaped as the function "cos$^2$." This preferred RF pulse shape is shown in FIG. 2A. The RF pulse has a rise time (10%–90% of the leading edge of the pulse) on the order of 1 microsecond, and a linear partial rise time (5%–30% of the leading edge) on the order of 250 nanoseconds.

Referring back to FIG. 1, incidental phase modulation (IPM) is generated by the RF modulation amplifier 18 during the partial rise time of the RF pulse. This modulation causes the upper frequency spectral components of the RF pulse to increase in amplitude, causing undesirable adjacent channel interference. Because of the limited available spectrum, transmitter IPM may deteriorate other navigation services operating on nearby frequencies.

The pulse transmitter 10 of FIG. 1 includes circuitry to correct for the incidental phase modulation (IPM) generated by the RF modulation amplifier 18. This operation is provided by a phase detector 26, a reference phase control circuit 28, a pre-distortion circuit 30, and a phase correction control circuit 32.

Phase detector 26, which in the preferred embodiment is a double-balanced microwave mixer, has a first input 27 for receiving a reference signal (at the carrier frequency) generated by the reference phase control circuit 28. In particular, the output (LO) of the frequency synthesizer 12 is applied through the power divider 14 and then to a phase shifter 34, which generates the reference signal (LO+$\phi_2$). The output of the phase shifter 34 is amplified in amplifier 36, applied through a 3 db pad 38 and then to the first input 27 of the phase detector 26. Phase detector 26 also includes a second input 29 for receiving a sample of the RF pulse to be transmitted. Specifically, a microwave power divider 40 provides the sample of the RF pulse to a 3 db pad 42, which is connected to the second input 29 of the phase detector 26. In response to the signals applied to the inputs 27 and 29, phase detector 26 generates a phase error signal on line 44.

Figure 2D:
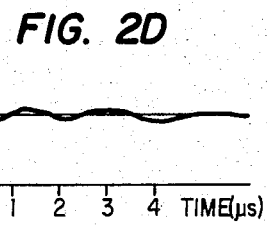
Figure 2B:
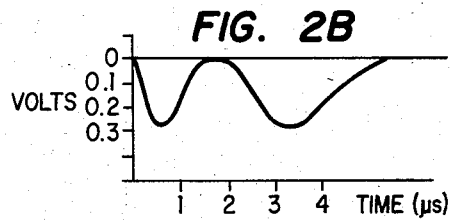

FIG. 2B shows the phase error signal waveform output from the phase detector 26 when no phase correction is applied by the control circuit 32. As is shown in this figure, the phase error signal varies in amplitude over the entire RF pulse duration due to incidental phase modulation, represented by the waveform in FIG. 2C, produced by the RF modulation amplifier 18. As will be described in more detail below, the phase correction control circuit 32 provides appropriate compensation to cancel the incidental phase modulation shown in FIG. 2C.

In operation, the reference phase control circuit 28 includes appropriate circuitry for adjusting the phase "$\phi_2$" of the reference signal to be equal to 90° relative to the RF pulse during the RF pulse peak, which causes the phase error signal output on line 44 from the phase detector 26 to be substantially zero volts at the peak of the RF pulse. This operation is accomplished in the following manner.

A peak detector 46 samples the modulation drive voltage output from the pulse modulator 22 to determine when the pulse peak occurs. At the pulse peak, the peak detector 46 opens a sampling gate 48, which samples the phase error signal from the phase detector 26 to produce phase error signal samples. These samples are then integrated by an integrator 50, amplified by an amplifier 52, and used to control the amount of phase shift provided by the phase shifter 34 such that the reference signal phase at the input of the phase detector is 90° relative to the phase of the RF pulse at its peak. Due to the operation of the phase detector 26, the reference phase control circuit 28 serves to maintain the reference signal, now shown in FIG. 2D, at approximately zero volts at the RF pulse peak.

In the preferred embodiment, the phase shifter 34 has a control range of over ±100°. Should the control signal output from the amplifier 52 exceed the control limit of the phase shifter 34, however, a limit detector switch 54 shifts the polarity of the phase error signal 44 by providing a 180° phase shift 56. This arrangement allows the reference phase control circuit 28 to "lock-up" and maintain phase lock on any channel of operation in the microwave landing system, despite dynamic environmental changes.

Therefore, the reference phase control circuit 28 generates the reference signal applied to the phase detector 26 and also includes appropriate circuitry for dynamically adjusting the phase of this signal. This adjustment serves to drive the phase error signal output from the phase detector 26 to a predetermined value, approximately zero volts, at the pulse peak. The phase error signal output on line 44 from the phase detector 26 is then used by the phase correction control circuit 32 to correct for incidental phase modulation (IPM) generated by the RF modulation amplifier 18.

Figure 2E:
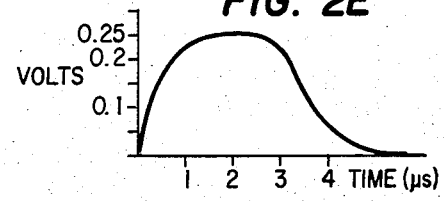
Figure 2C:
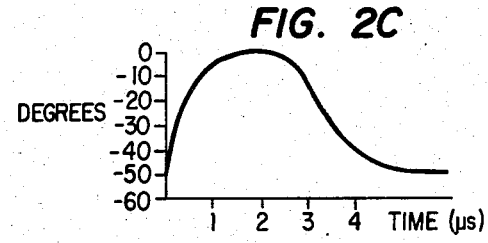

This operation is facilitated through use of the pre-distortion circuit 30, which receives the modulation drive voltage from the pulse modulator 22 as an input and generates a pre-modeled correction signal pulse shown in FIG. 2E. It has been found that the incidental phase modulation (shown in FIG. 2C) for the transmitter 10 has an approximately "logarithmic" relationship to the RF pulse amplitude (shown in FIG. 2A). The actual amount of observed phase shift (IPM) is dependent, however, on the channel of operation in the MLS, the tuning of the transmitter, and the environmental conditions encountered, even though the characteristic shape is approximately as shown in FIG. 2C. Normally, IPM varies from as much as 35° to 80°. According to the present invention, the transmitter IPM is compensated for by introducing phase modulation into the phase modulator 16 which is equal in magnitude but opposite in polarity to the expected IPM. This is accomplished by the phase correction control circuit 32.

Specifically, the modulation drive voltage is purposefully distorted by the pre-distortion circuit 30 (and in the preferred embodiment a logarithmic compression is used) to match the phase shift versus amplitude characteristic of the RF modulation amplifier 18. The output of the pre-distortion circuit 30, shown in FIG. 2E, is a correction signal pulse which is applied to one input of a variable gain amplifier 60. The other input to the variable gain amplifier 60 is the phase error signal 44, which has been previously sampled during the pulse rise time by gate 62 and integrated by an integrator 64. Gate 62 is opened for a set period of time under the control of the transmitter trigger signal previously described. Variable gain amplifier 60 and integrator 64 form an automatic gain control (AGC) circuit which controls the amplitude of the correction signal pulse applied to the phase modulator 16. The phase modulator 16 then introduces the necessary phase modulation "$\phi_1$" into the carrier frequency signal (LO) applied to the RF modulation amplifier 18 at a low signal level, prior to the high power amplification and modulation provided thereby. Because the correction signal pulse has been pre-modeled to be substantially equal in magnitude but opposite in polarity to the transmitter IPM, operation of the phase correction control circuit 32 corrects for undesirable phase modulation.

Although the phase correction control circuit 32 exhibits a relatively long time constant (i.e., approximately two seconds), the actual correction provided to the phase modulator 16 occurs instantaneously. This is because the signal derived from the integrated samples of the phase error signal drives the automatic gain control (AGC) circuit, rather than the phase modulator 16 itself. As noted above, the AGC circuit then supplies a predetermined amount of pre-modeled phase modulation to cancel the expected transmitter IPM.

An automatic level shift circuit 66 is also provided to ensure that the phase modulator drive remains constant (preferably at $-3.0$ V) for the peak of each pulse. With the IPM correction provided, the phase of the RF pulse is then represented in FIGURE 2F. This figure evidences that operation of the phase correction control circuit 32 ensures that the phase of the transmitted RF pulse remains substantially constant throughout the duration of the pulse.

Figure 2F:
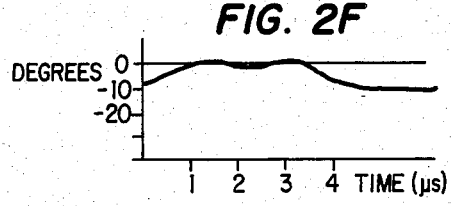

The pre-distortion circuit 30 does not perfectly model the transmitter IPM under all operating conditions, but is a good approximation for all conditions. Because of imperfections in the IPM modeling, the resulting phase detector phase error signal on line 44 will not be exactly zero volts throughout the duration of the pulse, shown by the waveform in FIG. 2D. The actual residual IPM is shown by the waveform in FIG. 2F. However, comparing the waveforms in FIG. 2C and FIG. 2F shows that the operation of the pulse transmitter circuit 10 described above results in significant reduction in the incidental phase modulation (IPM).

Although the invention has been described in detail, it is to be clearly understood that the same is by way of example only and not by way of limitation, the scope of the present invention being limited only by the terms of the appended claims.

I claim:

1. An RF pulse transmitter having incidental phase modulation (IPM) correction, comprising:
   means for generating a carrier signal having a predetermined frequency;
   means for generating a modulation drive signal;
   means responsive to the modulation drive signal for generating an RF pulse at the predetermined frequency;
   means for generating a reference signal at the predetermined frequency;
   means for receiving the RF pulse and the reference signal and in response thereto generating a phase error signal;
   said means for generating a reference signal including means for adjusting the phase of the reference signal to thereby drive the phase error signal to a predetermined value at a pulse peak of the RF pulse;
   means responsive to the modulation drive signal for generating a pre-modeled correction signal for use in correcting for the incidental phase modulation (IPM); and
   means responsive to the phase error signal for applying a portion of the correction signal to the means for generating an RF pulse to correct for the incidental phase modulation.

2. The RF pulse transmitter as described in claim 1 wherein said means for generating an RF pulse includes:
   means responsive to the carrier signal for generating a phase-modulated carrier signal; and
   means for receiving the phase-modulated carrier signal and the modulation drive signal and in response thereto generating the RF pulse.

3. The RF pulse transmitter as described in claim 2 wherein said adjusting means comprises:
   means for receiving the modulation drive signal and in response thereto generating a control signal at the pulse peak;
   means responsive to the control signal for sampling the phase error signal at said pulse peak to produce a plurality of phase error signal samples; and
   means for integrating the phase error signal samples to produce an output signal for use in adjusting the phase of the reference signal.

4. The RF pulse transmitter as described in claim 2 wherein said applying means comprises:
   means for sampling the phase error signal during a portion of the RF pulse to produce a plurality of phase error signal samples;
   means for integrating the phase error signal samples to produce an output signal; and
   means for receiving the correction signal and the output signal and in response thereto applying the portion of the correction signal to said means for generating a phase-modulated carrier signal to thereby substantially cancel the incidental phase modulation.

5. An RF pulse transmitter having incidental phase modulation (IPM) correction, comprising:
   a synthesizer for generating a carrier signal (LO);
   a phase modulator connected to receive the carrier signal from the synthesizer and in response thereto generating a phase-modulated carrier signal;
   a pulse modulator for generating a modulation drive signal;
   an RF modulation amplifier for receiving the phase-modulated carrier signal and the modulation drive signal and in response thereto generating an RF pulse having a pulse peak;
   a reference phase control circuit for generating a reference signal;
   a phase detector for receiving the RF pulse and the reference signal and in response thereto generating a phase error signal;
   the reference phase control circuit including means for adjusting the phase of the reference signal applied to the phase detector to thereby drive the phase error signal to a predetermined value at the pulse peak;
   a pre-distortion circuit for receiving the modulation drive signal and in response thereto generating a correction signal pulse for use in correcting for the incidental phase modulation (IPM); and
   a phase correction control circuit for receiving the phase error signal and in response thereto applying a portion of the correction signal pulse to the phase modulator to modulate the phase of the carrier signal applied to the RF modulation amplifier to correct for the incidental phase modulation (IPM).

6. The RF pulse transmitter as described in claim 5 wherein the correction signal pulse has a logarithmic relationship with respect to the modulation drive signal.

7. The RF pulse transmitter as described in claim 5 wherein the phase correction control circuit comprises:
   a gate for sampling the phase error signal during the rise time of the RF to produce a plurality of phase error signal samples;
   an integrator connected to the gate for integrating the phase error signal samples to produce an output signal; and
   a variable gain amplifier for receiving the correction signal and the output signal from the integrator, and in response thereto applying the portion of the correction signal to the phase modulator to modulate the phase of the carrier signal applied to the RF modulation amplifier.

8. The RF pulse transmitter as described in claim 7 wherein the phase correction control circuit also includes a level shift circuit for ensuring that the portion of the correction signal applied to the phase modulator has a constant value at the pulse peak.

9. The RF pulse transmitter as described in claim 5 wherein the reference phase control circuit includes a phase shifter and said adjusting means comprises:
   a peak detector for receiving the modulation drive signal and in response thereto generating a control signal at the pulse peak;
   a gate responsive to said control signal for sampling the phase error signal at said pulse peak to produce a plurality of phase error signal samples; and
   an integrator connected to the gate for integrating the phase error signal samples, and in response thereto providing an output signal to control the phase shifter to thereby drive the phase error signal to the predetermined value at the pulse peak.

10. The pulse transmitter as described in claim 9 wherein the adjusting means of said reference phase control circuit also includes:
    a limit detector circuit for determining whether said output signal is outside an operating range of said phase shifter; and
    means for changing the polarity of said phase error signal when said output signal is outside the operating range of said phase shifter.

11. An RF pulse transmitter for use in precision distance measuring equipment (DME/P) of a microwave landing system and having incidental phase modulation (IPM) correction, comprising:
    a frequency synthesizer for generating an unmodulated carrier signal (LO);
    a phase modulator connected to receive the carrier signal from the frequency synthesizer and in response thereto generating a phase-modulated carrier signal;
    a pulse modulator for generating a modulation drive voltage;
    an RF modulation amplifier for receiving the phase-modulated carrier signal and the modulation drive voltage and in response thereto generating an RF pulse having a pulse peak;
    means for generating a reference signal;
    a phase detector for receiving a sample of the RF pulse and the reference signal and in response thereto generating a phase error signal;
    a pre-distortion circuit for receiving the modulation drive voltage and in response thereto generating a correction signal pulse for use in correcting for the incidental phase modulation (IPM), said correction signal pulse having a logarithmic relationship with respect to the modulation drive voltage;
    a gate for sampling the phase error signal during the rise time of the RF pulse to produce a plurality of phase error signal samples;
    an integrator connector to said gate for integrating the phase error signal samples to produce a control signal; and
    a variable gain amplifier for receiving the control signal and in response thereto instaneously applying a portion of the correction signal to the phase modulator to modulate the phase of the carrier signal applied to the RF modulation amplifier to correct for the incidental phase modulation (IPM).

* * * * *